United States Patent
Maekawa et al.

(10) Patent No.: US 8,924,003 B2
(45) Date of Patent: Dec. 30, 2014

(54) THERMAL DISPLACEMENT COMPENSATION METHOD AND THERMAL DISPLACEMENT COMPENSATION DEVICE FOR MACHINE TOOL

(75) Inventors: Susumu Maekawa, Yamanashi (JP); Takahiro Endou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 756 days.

(21) Appl. No.: 13/182,483

(22) Filed: Jul. 14, 2011

(65) Prior Publication Data
US 2012/0123586 A1 May 17, 2012

(30) Foreign Application Priority Data
Nov. 11, 2010 (JP) .................................. 2010-252990

(51) Int. Cl.
| G06F 19/00 | (2011.01) |
| G01B 11/14 | (2006.01) |
| G01B 11/24 | (2006.01) |
| G01B 11/30 | (2006.01) |
| G01B 11/00 | (2006.01) |
| G05B 19/404 | (2006.01) |

(52) U.S. Cl.
CPC .... G05B 19/404 (2013.01); *G05B 2219/49207* (2013.01)
USPC ............ 700/173; 700/174; 700/193; 356/614

(58) Field of Classification Search
USPC ........................... 700/173, 174, 193; 356/614
See application file for complete search history.

(56) References Cited

U.S. PATENT DOCUMENTS

| 3,579,073 | A | * | 5/1971 | Johnstone et al. | ............ 318/634 |
| 4,413,422 | A | * | 11/1983 | Kitamura | .......................... 33/558 |
| 4,471,443 | A | * | 9/1984 | Kinoshita et al. | ............. 700/193 |
| 5,581,467 | A | * | 12/1996 | Yasuda | .......................... 700/193 |
| 5,895,181 | A | * | 4/1999 | Ito et al. | ........................ 409/132 |
| 6,019,506 | A | * | 2/2000 | Senda | ............................. 374/55 |

(Continued)

FOREIGN PATENT DOCUMENTS

| DE | 8710183 U1 | 10/1987 |
| DE | 60116192 T2 | 7/2006 |

(Continued)

OTHER PUBLICATIONS

Ramesh et al., Error Compensation in Machine tools—A Review Part II: thermal errors, 2000, Pergamon, International Journal of Machine Tools & Manufacture, pp. 1257-1284.*

(Continued)

*Primary Examiner* — Kavita Padmanabhan
*Assistant Examiner* — Jason Lin
(74) *Attorney, Agent, or Firm* — Lowe Hauptman & Ham, LLP

(57) ABSTRACT

In a thermal displacement compensation method for a machine tool, in which a feed shaft thermal displacement amount is obtained and an amount which cancels the obtained feed shaft thermal displacement amount is added as a thermal displacement compensation amount to a position command for a feed axis, a position where a signal is first output by a position sensor for detecting the position of a movable part of the machine tool is first stored as an initial position. Then, the position where the signal is output by the position sensor is detected, and the thermal displacement compensation amount is modified according to a compensation error, which is the difference between the detected position (actual position) and the initial position.

17 Claims, 7 Drawing Sheets

(56) References Cited

U.S. PATENT DOCUMENTS

| | | | |
|---|---|---|---|
| 6,167,634 B1* | 1/2001 | Pahk et al. | 33/702 |
| 6,269,284 B1* | 7/2001 | Lau et al. | 700/193 |
| 6,286,055 B1* | 9/2001 | Yamazaki et al. | 710/1 |
| 6,456,896 B1 | 9/2002 | Ito et al. | |
| 6,471,451 B2* | 10/2002 | Kojima et al. | 409/131 |
| 6,532,608 B2* | 3/2003 | Schreiner | 5/497 |
| 6,591,156 B1* | 7/2003 | Fukaya et al. | 700/159 |
| 6,651,019 B2* | 11/2003 | Mizuguchi et al. | 702/94 |
| 6,671,573 B2* | 12/2003 | Nigazawa et al. | 700/193 |
| 6,960,052 B2* | 11/2005 | Lutz et al. | 409/235 |
| 7,130,715 B2* | 10/2006 | Watanabe et al. | 700/193 |
| 7,245,983 B2* | 7/2007 | Suzuki et al. | 700/177 |
| 7,266,903 B2* | 9/2007 | Sato | 33/702 |
| 7,354,386 B2* | 4/2008 | Iefuji | 483/1 |
| 7,445,587 B2* | 11/2008 | Kojima et al. | 483/56 |
| 7,525,443 B2* | 4/2009 | Littrell | 340/679 |
| 7,778,725 B2* | 8/2010 | Senda | 700/175 |
| 7,853,350 B2* | 12/2010 | Jou et al. | 700/174 |
| 8,255,075 B2* | 8/2012 | Ou et al. | 700/175 |
| 8,294,403 B2* | 10/2012 | Haas et al. | 318/473 |
| 8,534,171 B2* | 9/2013 | Lin | 82/118 |
| 8,720,025 B2* | 5/2014 | Momoi et al. | 29/27 C |
| 2002/0004688 A1* | 1/2002 | Kojima et al. | 700/193 |
| 2002/0189120 A1* | 12/2002 | Kaneda et al. | 33/636 |
| 2006/0221341 A1* | 10/2006 | Paul et al. | 356/406 |
| 2008/0215178 A1* | 9/2008 | Senda | 700/175 |
| 2009/0244550 A1* | 10/2009 | Fujishima et al. | 356/614 |

FOREIGN PATENT DOCUMENTS

| | | |
|---|---|---|
| JP | 10020912 A | 1/1998 |
| JP | 10-138091 A | 5/1998 |
| JP | 2002-018677 A | 1/2002 |
| JP | 2002-144192 A | 5/2002 |
| JP | 3405965 B2 | 3/2003 |
| JP | 2007-021721 A | 2/2007 |
| JP | 2010-082724 A | 4/2010 |
| JP | 2010-247276 A | 11/2010 |

OTHER PUBLICATIONS

Office Action issued by the German Patent Office on Sep. 19, 2012 in corresponding Application No. DE102011 055-036.4, with English translation.

Office Action issued by the Chinese Patent Office on Oct. 17, 2012 in corresponding Application No. CN201110372104.1, with English translation.

Japanese Office Action mailed Oct. 18, 2011 in JP Patent Application No. 2010-252990.

* cited by examiner

FIG.3

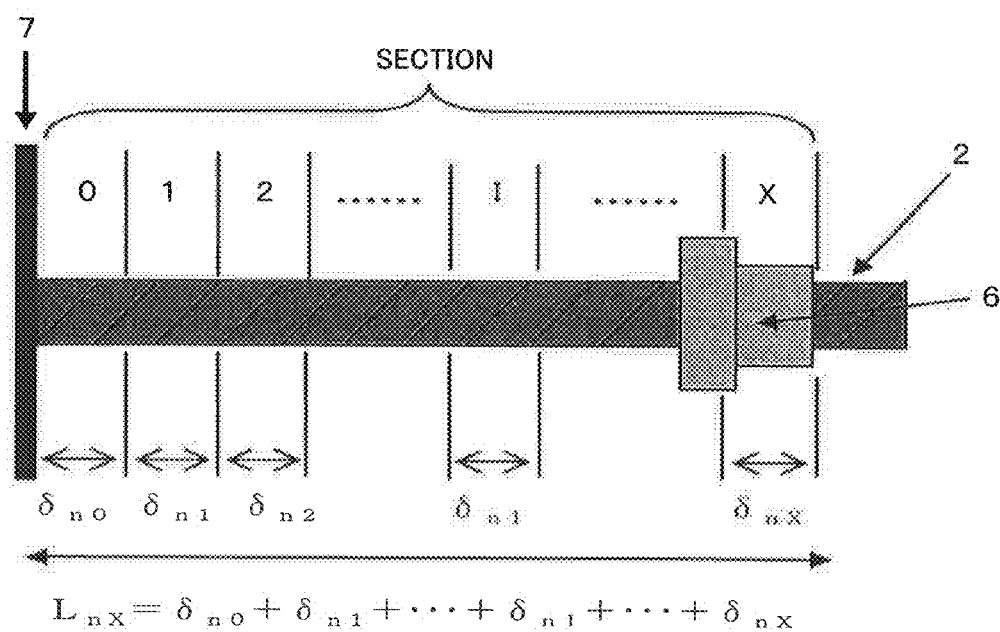

$$L_{nx} = \delta_{n0} + \delta_{n1} + \cdots + \delta_{ni} + \cdots + \delta_{nx}$$

FIG.4

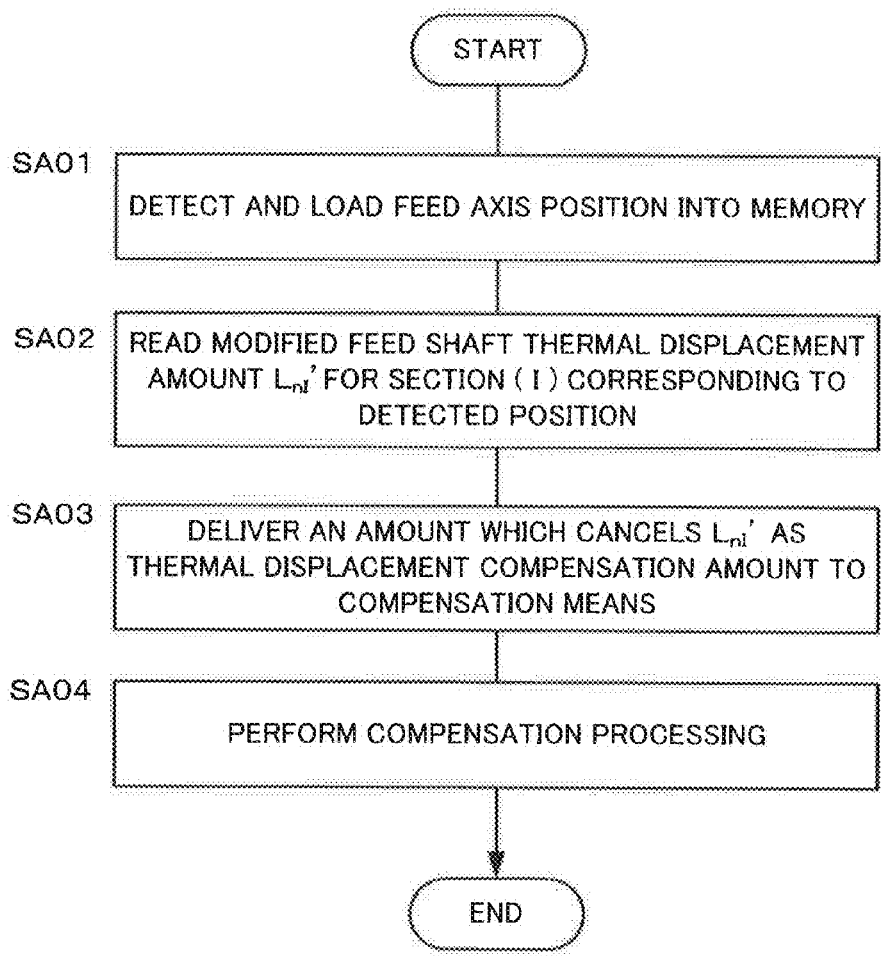

SA01 DETECT AND LOAD FEED AXIS POSITION INTO MEMORY

SA02 READ MODIFIED FEED SHAFT THERMAL DISPLACEMENT AMOUNT $L_{ni}'$ FOR SECTION (I) CORRESPONDING TO DETECTED POSITION

SA03 DELIVER AN AMOUNT WHICH CANCELS $L_{ni}'$ AS THERMAL DISPLACEMENT COMPENSATION AMOUNT TO COMPENSATION MEANS

SA04 PERFORM COMPENSATION PROCESSING

THERMAL DISPLACEMENT COMPENSATION METHOD AND THERMAL DISPLACEMENT COMPENSATION DEVICE FOR MACHINE TOOL

RELATED APPLICATIONS

The present application is based on, and claims priority from, Japanese Application Number 2010-252990, filed Nov. 11, 2010.

BACKGROUND OF THE INVENTION

1. Field of the Invention

The present invention relates to a thermal displacement compensation method and a thermal displacement compensation device for a machine tool.

2. Description of the Related Art

In a machine tool, a feed screw and spindle are driven by a motor, so that they are expanded by heat from the motor, frictional heat from rotating bearings, frictional heat from an engaging portion between a ball screw and nut of the feed screw, thereby causing a shift in machine position. Thus, the relative positions of a workpiece to be positioned and a tool are shifted. This shift in machine position due to heat impedes high-precision machining.

Conventionally, some techniques and structures have been used to prevent this heat-induced shift of the machine position. In one such technique, thermal displacement is simply compensated at low cost without using a temperature sensor. In another technique, a command position is compensated based on displacement and temperature detected by displacement and temperature sensors. Further, there is a preventive structure in which initial tension is applied to a feed screw to eliminate the influence of thermal expansion.

The following is a description of prior art examples relating to thermal displacement compensation.

(1) In a technique disclosed in Japanese Patent Application Laid-Open No. 2002-18677, the entire stroke of a feed shaft is divided into a plurality of sections, the position of each section of the feed shaft is detected, and an average moving speed for the section is obtained from the detected position. A thermal displacement amount for the section concerned (based on heat generation and radiation and heat transmitted from other sections adjacent to the section concerned by thermal conduction) is estimated from the average moving speed thus obtained. According to this technique, high-precision compensation can be achieved without regard to the position of the feed shaft (or for every position). Further, the thermal displacement can be precisely compensated in consideration of thermal displacements due to heat from a spindle or spindle motor, as well as heat from the feed screw. Furthermore, more accurate compensation can be achieved by modifying a heat generation coefficient in a thermal displacement amount calculation formula, based on a deviation (compensation error) between the estimated thermal displacement amount (compensation amount) and an actual machine position.

Thus, according to the technique disclosed in the patent document described above, the thermal displacement amount is estimated based on the position and speed of the feed shaft, the spindle speed, and the load of the spindle motor, whereby high-precision compensation can be achieved without regard to the feed shaft position. For higher-precision compensation, however, there is room for consideration of thermal displacements that depend on changes in ambient temperatures, such as the room temperature, cutting fluid temperature, etc. Further, the patent document described above discloses a method in which a heat generation coefficient in a thermal displacement amount computational formula is modified using a compensation error. Since the computational formula includes other coefficients (heat loss coefficient and heat conduction coefficient for calculation of heat conduction from adjacent sections), the accuracy of compensation cannot be further improved by only modifying the heat generation coefficient, in some cases. Although compensation is more accurate in a position where an actual compensation error is measured, it is not always so in other positions (2) In a technique disclosed in Japanese Patent Application Laid-Open No. 2010-82724, a ball screw shaft thermal displacement amount (thermal displacement amount of an entire ball screw shaft including those sections of the ball screw shaft where a nut is immovable, as well as a nut-carrying portion of the screw shaft) is obtained by detecting the rotational speed of a servomotor without using a sensor.

The technique disclosed in the patent document described above, like the technique disclosed in the above-mentioned Japanese Patent Application Laid-Open No. 2002-18677, is designed to precisely estimate and compensate a thermal displacement amount without using a sensor. Since the compensation is performed without consideration of the influences of changes in ambient temperatures, such as the room temperature, cutting fluid temperature, etc., however, accurate compensation sometimes cannot be achieved. In addition, there is no indication of a method for overcoming compensation errors, if any.

(3) In a technique disclosed in Japanese Patent Application Laid-Open No. 2007-21721, a thermal displacement amount of a ball screw is obtained by means of a sensor, and a pitch error compensation value of the ball screw is obtained based on the obtained thermal displacement amount. Specifically, the length (A) of the ball screw, pitch error compensation values (Pn) for a plurality of divisions of the overall length (stroke) of the ball screw, and positions (Dn) of the divisions are previously registered in an NC device. Then, a variation ($\Delta A$) of the length due to thermal displacement of the ball screw is measured by a sensor, and the variation of the ball screw length for the position (Dn) of each division is obtained using the calculation formula, $Dn \times \Delta A/A$. The sum of the pitch error compensation value (Pn) for the division concerned and the variation ($Dn \times \Delta A/A$) is registered as a new pitch error compensation value in the NC device. Then, pitch error compensation is performed based on the registered new pitch error compensation value.

In the technique disclosed in the patent document described above, the calculation of the new pitch error compensation value is performed on the assumption that the ball screw is uniformly displaced without regard to the position. Normally, however, the displacement amount for each division of the ball screw varies depending on the rotational speed of the ball screw (moving speed of a nut) and its moved position. Therefore, accurate compensation based on the ball screw position cannot be achieved by this method. According to the technique disclosed in this patent document, unlike the technique disclosed in the above-mentioned Japanese Patent Application Laid-Open No. 2002-18677, the displacement amount is detected by a position sensor. Since the distribution of thermal displacements in the individual positions of the ball screw is out of consideration in this case, however, accurate compensation cannot be achieved.

(4) A technique disclosed in Japanese Patent Application Laid-Open No. 2002-144192 is an inter-two-point displacement compensation method for a feed screw, in which a difference between two points at the opposite ends of the feed screw is obtained, and error compensation is performed for the entire stroke for which an origin shift amount and pitch error compensation amount are determined by the difference.

The technique disclosed in the patent document described above, like the technique disclosed in the above-mentioned Japanese Patent Application Laid-Open No. 2007-21721, is based on the assumption that the distribution of thermal displacements between two points is uniform, so that accurate compensation cannot be achieved based on the ball screw position. According to the technique disclosed in this patent document, unlike the technique disclosed in the above-mentioned Japanese Patent Application Laid-Open No. 2002-18677, the displacement amount is detected by a position sensor. Since the distribution of thermal displacements in the individual positions of the ball screw is out of consideration in this case, however, accurate compensation cannot be achieved.

(5) In a technique disclosed in Japanese Patent Application Laid-Open No. 10-138091, a compensation amount is obtained according to an approximation formula based on an average moving speed, frequency of movement, moved position, and disturbance load torque of a feed shaft. If change of the obtained compensation amount exceeds a preset value, the position or temperature is measured by a sensor, and the compensation amount is updated based on the measured value.

In the technique disclosed in the patent document described above, a thermal displacement amount measured by a sensor, not one predicted according to an approximation formula, is used as a compensation amount when the change of the compensation amount is substantial. Since coefficients of a computational formula for estimating the thermal displacement amount and the like are not designed to be modified based on the result of the sensor measurement, the measurement result is not reflected in the estimation of subsequent thermal displacement amounts, so that the accuracy of the displacement amount estimation cannot be improved.

SUMMARY OF THE INVENTION

Accordingly, the object of the present invention is to provide a thermal displacement compensation method and a thermal displacement compensation device for a machine tool, in which the distribution of thermal displacement in each position of a feed axis is estimated, the position of the feed axis is detected by a position sensor, and a compensation amount for a position command of the feed axis is increased or reduced based on the detected position, whereby compensation can be achieved in consideration of even thermal displacements that do not depend on machine operation, such as changes in ambient temperatures.

In a thermal displacement compensation method for a machine tool according to the present invention, a position command for a feed axis is compensated by obtaining a feed shaft thermal displacement amount and adding an amount which cancels the obtained feed shaft thermal displacement amount as a thermal displacement compensation amount to the position command for the feed axis. This method comprises a step of setting a position sensor in a detectable position where the position of a movable part of the machine tool is detectable such that the position sensor outputs a signal when the detectable position is reached by the movable part, and then previously storing a position where the signal is first output by the position sensor as an initial position, a step of detecting the position where the signal is output by the position sensor as an actual position, a step of calculating the difference between the stored initial position and the detected actual position as a compensation error in the initial position, and a step of modifying the thermal displacement compensation amount according to the calculated compensation error.

The initial position may be previously stored before the start of machining.

The modification of the thermal displacement compensation amount may be performed by obtaining an error compensation rate from the ratio of the compensation error to the thermal displacement compensation amount in the initial position and then increasing or reducing the feed shaft thermal displacement amount by multiplying the feed shaft thermal displacement amount by the obtained error compensation rate.

The thermal displacement compensation may be performed by obtaining a feed shaft thermal displacement amount in accordance with the position of the feed axis, and the modification of the thermal displacement compensation amount may be performed by obtaining an error compensation amount from the compensation error and the ratio of the feed shaft thermal displacement amount in the position of the feed axis to the feed shaft thermal displacement amount in the initial position and then increasing or reducing the feed shaft thermal displacement amount by adding the obtained error compensation amount to the feed shaft thermal displacement amount.

The thermal displacement compensation may be performed by dividing the feed axis into a plurality of sections and obtaining the feed shaft thermal displacement amount for each section, and the modification of the thermal displacement compensation amount may be performed in accordance with the compensation error and the thermal displacement compensation amount for that one of the sections which covers the initial position, or in accordance with the feed shaft thermal displacement amounts for those sections which cover the initial position and the position of the feed axis, individually.

The position sensor may be set in a position allowing the position sensor to detect a position of the movable part within a range of movement of the movable part based on a machining program, and the modifying of the thermal displacement compensation amount may be performed while the machining program is being executed.

A thermal displacement compensation device for a machine tool according to the present invention comprises feed shaft thermal displacement amount calculation means for calculating a thermal displacement amount of a feed shaft, thermal displacement compensation amount calculation means for calculating, as a thermal displacement compensation amount, an amount which cancels the feed shaft thermal displacement amount calculated by the feed shaft thermal displacement amount calculation means, and compensation means for performing compensation by adding the thermal displacement compensation amount to a position command for a feed axis. The thermal displacement compensation device further comprises position detection means set in a position where the position of a movable part of the machine tool is detectable and comprising a position sensor configured to output a signal when the detectable position is reached by the movable part, initial position storage means for previously storing a position where the signal is first output by the position detection means as an initial position, actual position detection means for detecting as an actual position the position where the signal is output by the position detection means, compensation error calculation means for calculating, as a compensation error, the difference between the initial position stored in the initial position storage means and the actual position detected by the actual position detection means, and thermal displacement compensation amount modifying means for modifying the thermal displacement compensation amount in accordance with the compensation error.

The initial position storage means may be configured to previously store the initial position before the start of machining.

The thermal displacement compensation amount modifying means may obtain an error compensation rate from the ratio of the compensation error to the thermal displacement compensation amount in the initial position, and increase or reduce the feed shaft thermal displacement amount by multiplying the feed shaft thermal displacement amount by the obtained error compensation rate.

The feed shaft thermal displacement amount calculation means may calculate a feed shaft thermal displacement amount in accordance with the position of the feed axis, and the thermal displacement compensation amount modifying means may obtain an error compensation amount from the compensation error and the ratio of the feed shaft thermal displacement amount in the position of the feed axis to the feed shaft thermal displacement amount in the initial position, and increase or reduce the feed shaft thermal displacement amount by adding the obtained error compensation amount to the feed shaft thermal displacement amount.

The feed shaft thermal displacement amount calculation means may calculate the feed shaft thermal displacement amount by dividing the feed axis into a plurality of sections and obtaining the feed shaft thermal displacement amount for each section, and the thermal displacement compensation amount modifying means may modify the thermal displacement compensation amount in accordance with the compensation error and the thermal displacement compensation amount for that one of the sections which covers the initial position, or in accordance with the feed shaft thermal displacement amounts for those sections which cover the initial position and the position of the feed axis, individually.

The position detection means may be set in a position allowing the position detection means to detect a position of the movable part within a range of movement of the movable part based on a machining program, and the thermal displacement compensation amount modifying means may modify the thermal displacement compensation amount while the machining program is being executed.

According to the present invention, there may be provided a thermal displacement compensation method and a thermal displacement compensation device for a machine tool, in which the distribution of thermal displacement in each position of a feed axis is estimated, the position of the feed axis is detected by a position sensor, and a compensation amount for a position command of the feed axis is increased or reduced based on the detected position, whereby compensation can be achieved in consideration of even thermal displacements that do not depend on machine operation, such as changes in ambient temperatures. According to the present invention, moreover, the distribution of thermal displacement in each position of the feed axis is estimated, and the compensation amount is modified without changing the estimated thermal displacement distribution, based on the position detected by the position sensor, so that high-precision compensation can be achieved in consideration of even thermal displacements that do not depend on the machine operation, such as changes in ambient temperatures, without regard to the position of the feed axis. According to the present invention, furthermore, the position can be detected and compensated without requiring any special operation for position detection and without affecting the machining time.

BRIEF DESCRIPTION OF THE DRAWINGS

The above and other objects and features of the present invention will be obvious from the ensuing description of embodiments with reference to the accompanying drawings, in which:

FIG. 3 is a diagram illustrating how the overall length of a feed screw constituting a feed axis is divided into a plurality of sections;

FIG. 4 is a flowchart showing processing procedures for thermal displacement;

DETAILED DESCRIPTION OF THE PREFERRED EMBODIMENTS

A. A position sensor configured to detect the position of a feed axis and used for thermal displacement compensation of a machine tool according to the present invention will first be described with reference to FIG. 1.

Figure 1:
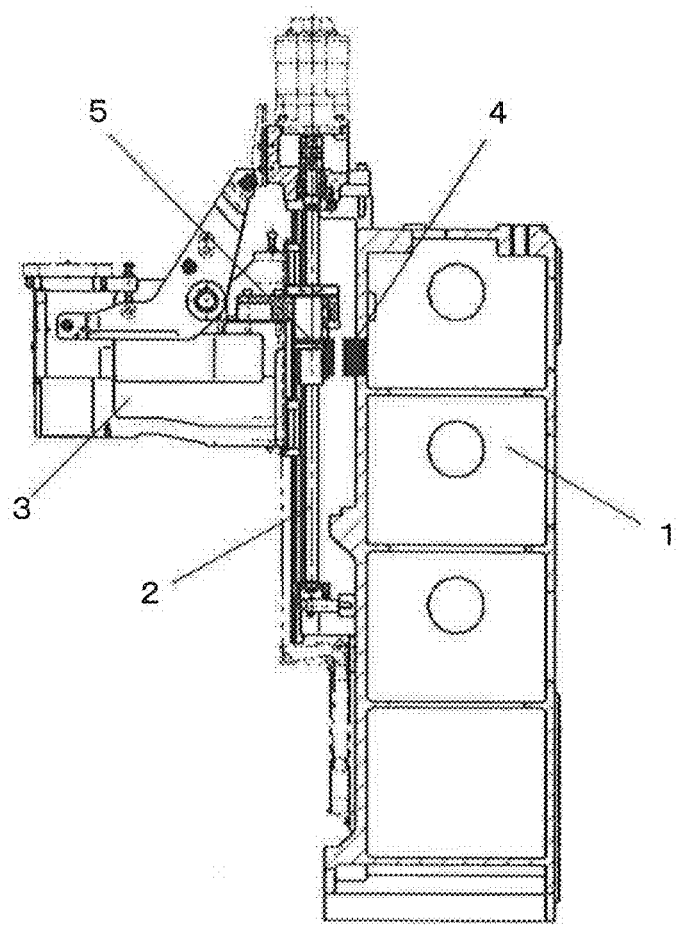
FIG. 1 is a view illustrating an example of the location of a position sensor configured to detect the position of a feed axis and used for thermal displacement compensation of a machine tool according to the present invention.

FIG. 1 is a view illustrating an example of the location of a position sensor for detecting the thermal displacement of the feed axis of the machine tool.

In order to detect the position of a Z-axis as a feed axis, the position sensor is mounted in a predetermined position on the main body of the machine tool. For example, a non-contact magnetic proximity switch (hereinafter referred to as "proximity switch"), formed of a detection head 4 and a magnetism generation body 5, is used as the position sensor. The detection head 4 is set on a stationary part (such as a bed, column, or saddle immovable relative to each feed axis) of the machine tool, and the magnetism generation body 5 is set on a movable part (such as a spindle head, table, saddle, or nut in mesh with one of the feed shafts movable along each feed axis). Alternatively, the magnetism generation body 5 may be set on the stationary part of the machine body, and the detection head 4 may be set on the movable part.

The mounting position of the proximity switch on the machine tool may be any position within a range in which the position of the movable part of the machine tool can be detected. Higher-precision compensation can be achieved by mounting the proximity switch so that the position of the movable part detected by the proximity switch is near the machining point.

If the proximity switch is mounted in an arbitrary position within the range of movement of the movable part of the machine tool during machining operation at the least, the position can be detected during the machining operation without requiring any special operation for detection. Consequently, the position of the movable part can be detected and compensated without affecting the machining cycle time. Even in the case where the proximity switch is mounted within the range of movement during the machining operation, the position of the movable part may be detected by performing a special operation for detection. If the location of the proximity switch is outside the range of movement for the machining operation, moreover, the special operation for position detection is performed at an appropriate timing.

A position to be detected by the proximity switch is stored in advance as an initial position in a nonvolatile memory 'before the start of workpiece machining'. 'Before the start of workpiece machining' mentioned above includes 'before factory shipment', for example, where the position detected by a proximity switch is stored as an initial position in a nonvolatile memory. It should be noted here that "before the start of workpiece machining" is not limited to the point in time before factory shipment, and may alternatively be the point in time when the mounting position of the proximity switch is changed in accordance with the details of machining after factory shipment or before the starting time every morning. Further, the initial position may be stored immediately after the start of workpiece machining such that the influence of thermal displacement due to the operation of the machine tool can be ignored, instead of before.

If the values of the initial position stored in the nonvolatile memory and the position detected by the proximity switch are larger than preset thresholds, a warning inducing an operator to register the initial position again may be given, based on determination that the mounting position of the proximity switch is changed (or shifted).

The position sensor is not limited to the magnetic proximity switch, and may alternatively be a non-contact switch for position detection, such as an inductive proximity switch, capacitive proximity switch, etc., or a contact switch for position detection, such as a limit switch, microswitch, etc.

Figure 2:
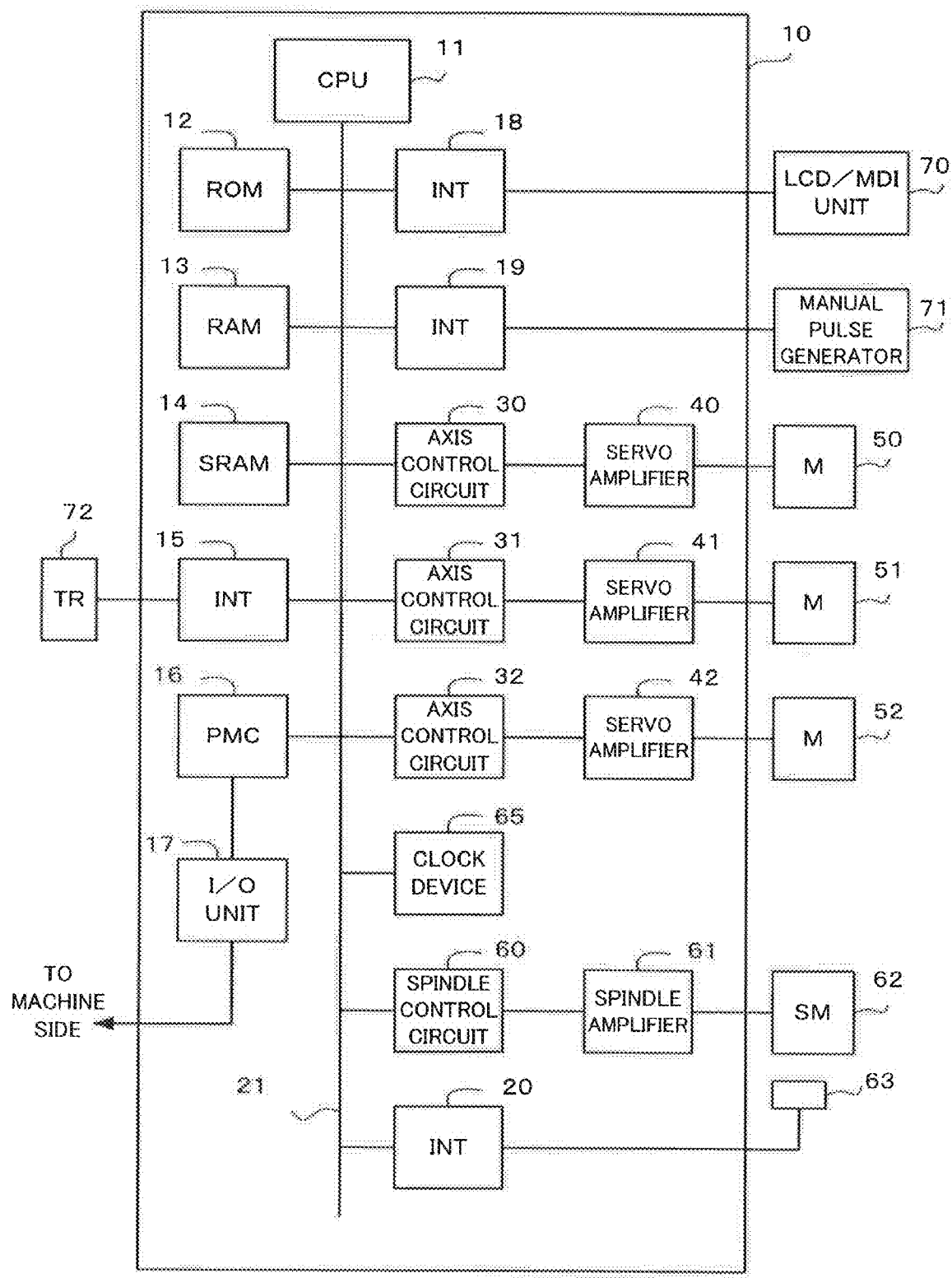
FIG. 2 is a functional block diagram showing a principal part of a numerical controller of the machine tool.

FIG. 2 is a functional block diagram showing a principal part of a numerical controller of the machine tool.

A processor (CPU) 11 of a numerical controller 10 reads a system program stored in a ROM 12 through a bus 21, and generally controls the numerical controller 10 in accordance with the read system program. A RAM 13 is loaded with temporary calculation data, display data, and various data input by an operator through an LCD/MDI unit 70.

An SRAM 14 is a nonvolatile memory that is backed up by a battery (not shown) so that it can maintain its storage state even after the numerical controller 10 is powered off. Various programs such as a program for the measurement of the initial position, a program for thermal displacement compensation of the machine tool, a machining program (described later) read through an interface 15, and a machining program input through the LCD/MDI unit 70 are stored in the SRAM 14. Further, various system programs for execution of edit-mode processing required for the creation and editing of the machining program and processing for automatic operation is preloaded in the ROM 12.

The interface 15 serves for external equipment that can be connected to the numerical controller 10 and is connected with an external device 72, such as an external storage device. The machining program, thermal displacement measurement program, etc., are read from the external storage device. A programmable machine controller (PMC) 16 controls auxiliary devices or the like on the machine tool side by means of sequential programs installed in the numerical controller 10. Necessary signals on the auxiliary device side are converted with these sequential programs in accordance with M-, S- and T-functions commanded by the machining program. The converted signals are output to the auxiliary device side through an input-output unit 17. The various auxiliary devices, e.g., actuators, are activated by these output signals. When signals are received from various switches of a control panel on the machine tool body, moreover, they are processed as required and delivered to the processor 11.

The LCD/MDI unit 70 is a manual data input device provided with a display, keyboard, etc. Image signals indicative of the current position of each axis of the machine tool, alarms, parameters, image data, etc., are delivered to the LCD/MDI unit 70 and displayed on its display. An interface 18 receives data from the keyboard of the LCD/MDI unit 70 and delivers it to the processor 11.

An interface 19 is connected to a manual pulse generator 71. The manual pulse generator 71 is mounted on the control panel of the machine tool and used to position precisely movable parts of the machine tool by controlling respective axes using distributed pulses based on manual operation.

X- and Y-axis control circuits 30 and 31 for moving the table (not shown) of the machine tool and a control circuit 32 for the Z-axis as a feed axis of the machine tool receive move commands from the individual axes from the processor 11 and output the commands to servo amplifiers 40 to 42. On receiving these commands, the servo amplifiers 40 to 42 drive servomotors 50 to 52 for the individual axes of the machine tool, respectively. Encoders for position detection are incorporated individually in the servomotors 50 to 52. Position signals from these encoders are fed back as pulse trains.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a commanded rotational speed, thereby driving a tool.

A position detector 63 is coupled to the spindle motor 62 by gears, a belt, or the like. The position detector 63 outputs feedback pulses in synchronism with the rotation of a spindle, and the feedback pulses are read through an interface 20 by the processor 11. Reference numeral 65 denotes a clock device adjusted so as to synchronize with the current time.

B. The following is a description of a first embodiment for the thermal displacement compensation of the machine tool according to the present invention.

(b1) Setting of sections for estimation and compensation of thermal displacement amount of feed axis:

The calculation and compensation of the thermal displacement amount of the feed axis will be described first. A calculation (estimation) method described here is the same as that disclosed in Japanese Patent Application Laid-Open No. 2002-18677 described before.

First, the overall length (stroke) of a feed screw 2 that constitutes a feed axis is divided into a plurality of sections, as shown in FIG. 3. The overall length of the feed screw 2 is equal to a distance from one end surface of a fixed bearing (specifically, an end surface of the fixed bearing on the side of a nut 6; defined as a reference position 7) that supports one end of the feed screw to one end surface of the nut 6 which is in engagement with the feed screw 2 and has moved along the feed screw 2 and reached the farthest position from the fixed bearing (specifically, to an end surface of the nut 6 opposite to its fixed-bearing-side end surface). The overall length of the feed screw 2 is divided into a plurality of sections, of which the section that adjoins the reference position 7 is defined as section 0, and its adjacent section is defined as section 1. The farthest section from the reference position 7 is defined as section X.

If the overall length of the feed screw 2 is divided into a finite number (X) of sections, the amount of thermal displacement (feed shaft thermal displacement amount) in position X produced by the thermal displacement of the feed axis, that is, a feed shaft thermal displacement amount $L_{nX}$ in section X at time n, is obtained by adding up thermal displacement amounts for the individual sections from the reference position 7 to section X according to equation (1) as follows:

$$L_{nX} = \delta_{n0} + \delta_{n1} + \ldots + \delta_{nI} + \ldots + \delta_{nX} \qquad (1)$$

In equation (1), $\delta_{nI}$ is a thermal displacement amount for section I (=0, 1, 2, . . . X), and $L_{nX}$ is a feed shaft thermal displacement amount for section X at time n.

(b2) Compensation of thermal displacement of feed axis:

The following is a description of thermal displacement compensation. In the thermal displacement compensation, the processing shown in the flowchart of FIG. 4 is performed for each predetermined short period (e.g., for each 4 millisecond).

In this processing, the feed axis position is detected and loaded into the memory. Then, "modified feed shaft thermal displacement amount $L_{nI}'$" for section I corresponding to the detected feed axis position is read from the memory. An amount that cancels the modified feed shaft thermal displacement amount $L_{nI}'$ thus read is assumed to be a thermal displacement compensation amount. Specifically, the thermal displacement compensation amount is given by ($-1\times$ modified feed shaft thermal displacement amount $L_{nI}'$). In this way, the thermal displacement compensation amount is added to a position command for the feed axis to compensate it.

The following is a sequential description of steps of the processing shown in the flowchart of FIG. 4.

[Step SA01] The position of the feed axis is detected and loaded into the memory.

[Step SA02] The modified feed shaft thermal displacement amount $L_{nI}'$ for section I (=0, 1, 2, . . . X) corresponding to the feed axis position detected in Step SA01 is read from the memory. The modified feed shaft thermal displacement amount $L_{nI}'$ will be described later.

[Step SA03] The amount ($-1\times L_{nI}'$) that cancels the modified feed shaft thermal displacement amount $L_{nI}'$ read in Step SA02 is delivered as a thermal displacement compensation amount to compensation means.

[Step SA04] The compensation means performs compensation processing using the thermal displacement compensation amount ($-1\times L_{nI}'$) for each section delivered in Step SA03, whereupon the processing terminates.

Figure 5:
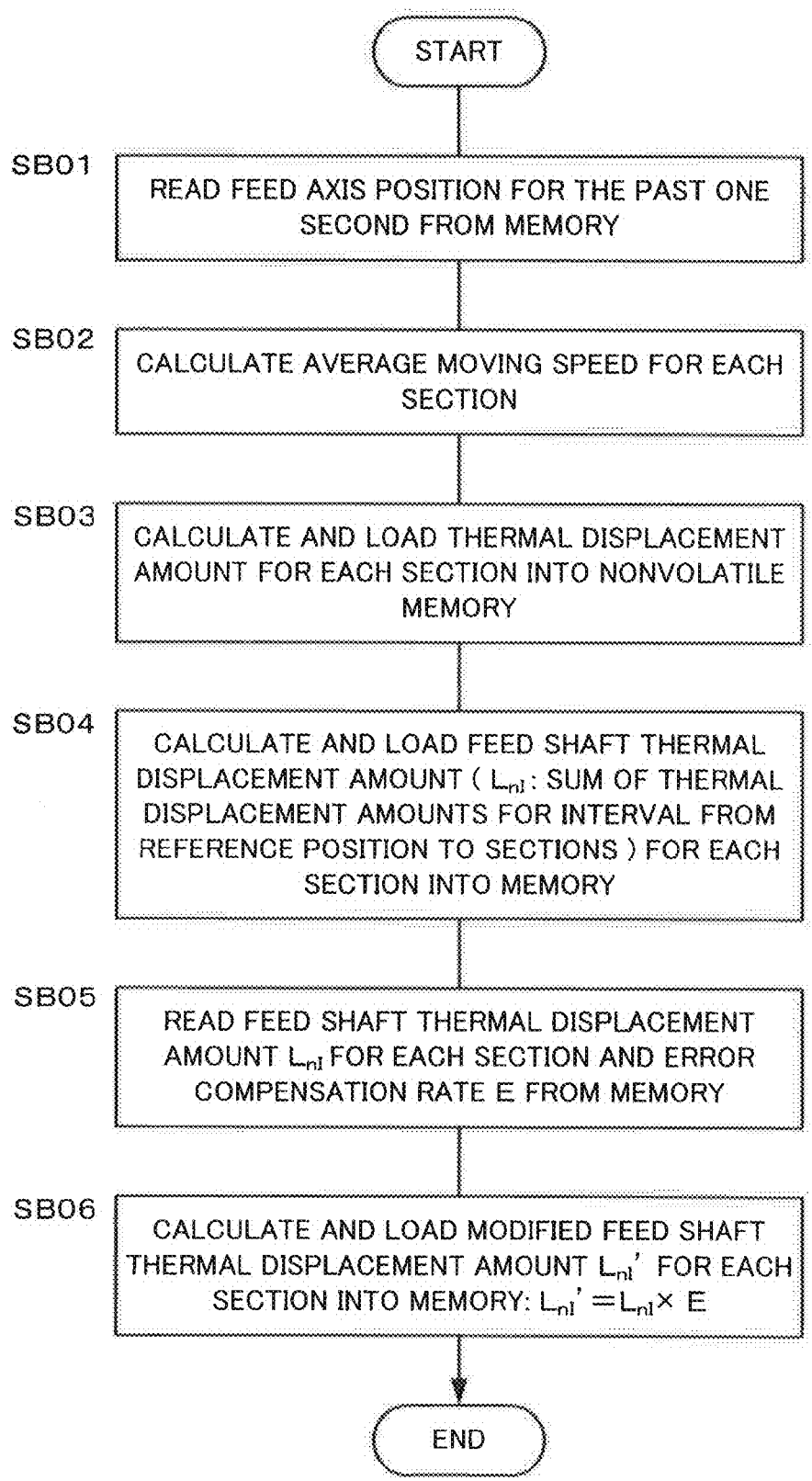
FIG. 5 is a flowchart showing processing procedures for thermal displacement amount calculation.

(b3) Calculation of thermal displacement amount of feed axis:

In calculating the thermal displacement amount, the processing shown in the flowchart of FIG. 5 is performed for each predetermined period (e.g., for each second). The following is a sequential description of steps of the processing shown in the flowchart of FIG. 5.

[Step SB01] The feed axis position over the past one second, stored in a memory in the processing (Step SA01) shown in the flowchart of FIG. 4, is read from the memory.

[Step SB02] An average moving speed for each section is obtained based on the feed axis position read from the memory in Step SB01.

[Step SB03] The thermal displacement amount for each section is obtained based on the average moving speed for each section in Step SB02 and loaded into the nonvolatile memory.

[Step SB04] A feed shaft thermal displacement amount $L_{nI}$ for the interval from the reference position 7 to section I (I=0, 1, 2, . . . ) is obtained using the following equation (1'), a transformation of the equation (1), and loaded into the memory:

$$L_{nI} = \delta_{n0} + \delta_{n1} + \delta_{n2} + \ldots + \delta_{nI} \qquad (1')$$

For example, feed shaft thermal displacement amounts for sections 0, 1 and 2 are $L_{n0} = \delta_{n0}$, $L_{n1} = \delta_{n0} + \delta_{n1}$, and $L_{n2} = \delta_{n0} + \delta_{n1} + \delta_{n2}$, respectively.

[Step SB05] The feed shaft thermal displacement amount $L_{nI}$ for each section I (I=0, 1, 2, . . . ) and a preloaded error compensation rate E are read from the memory.

[Step SB06] The feed shaft thermal displacement amount $L_{nI}$ for each section I (I=0, 1, 2, . . . ) read from the memory in Step SB05 is modified according to the following equation (2), based on the error compensation rate E also read from the memory in Step SB05, and the modified feed shaft thermal displacement amount $L_{nI}'$ is loaded into the memory, whereupon the processing terminates:

$$L_{nI}' = L_{nI} \times E \qquad (2)$$

(b4) Calculation of error compensation rate E:

The following is a description of a method for calculating the error compensation rate E. The error compensation rate E is calculated by performing the processing shown in the flowchart of FIG. 6 for each predetermined short period (e.g., for each 4 millisecond, as in the case of FIG. 4). The following is a sequential description of steps of the processing shown in the flowchart of FIG. 6.

[Step SC01] It is determined whether or not a signal is output from the position sensor. If there is a signal output, the program proceeds to Step SC02. If not, the processing terminates.

[Step SC02] If the output signal from the position sensor is received while the feed axis is moving, the actual position of the feed axis is detected based on the signal from the position sensor. This actual position is a position detected after thermal displacement compensation.

[Step SC03] An error c in the previously stored initial position is obtained from the difference between the initial position and the actual position detected in Step SC02. This error c is the difference between the previously stored initial position and the position detected after performing thermal displacement compensation during the machining operation, that is, a compensation error.

[Step SC04] A modified feed shaft thermal displacement amount $L_{nS}'$ for the section (assumed to be section S) that covers the initial position is read from the memory.

[Step SC05] The error compensation rate E is read from the nonvolatile memory.

[Step SC06] A modified error compensation rate E' is obtained according to the following equation (3) based on the modified feed shaft thermal displacement amount $L_{nS}'$ for the section (assumed to be section S) that covers the initial position, read in Step SC04, the compensation error c obtained in Step SC03, and the error compensation rate E read in Step SC05:

$$E' = E \times (1 + \epsilon / L_{nS}') \qquad (3)$$

[Step SC07] The modified error compensation rate E' obtained in Step SC06 is loaded as a new error compensation rate E into the nonvolatile memory, whereupon the processing terminates.

Figure 6:
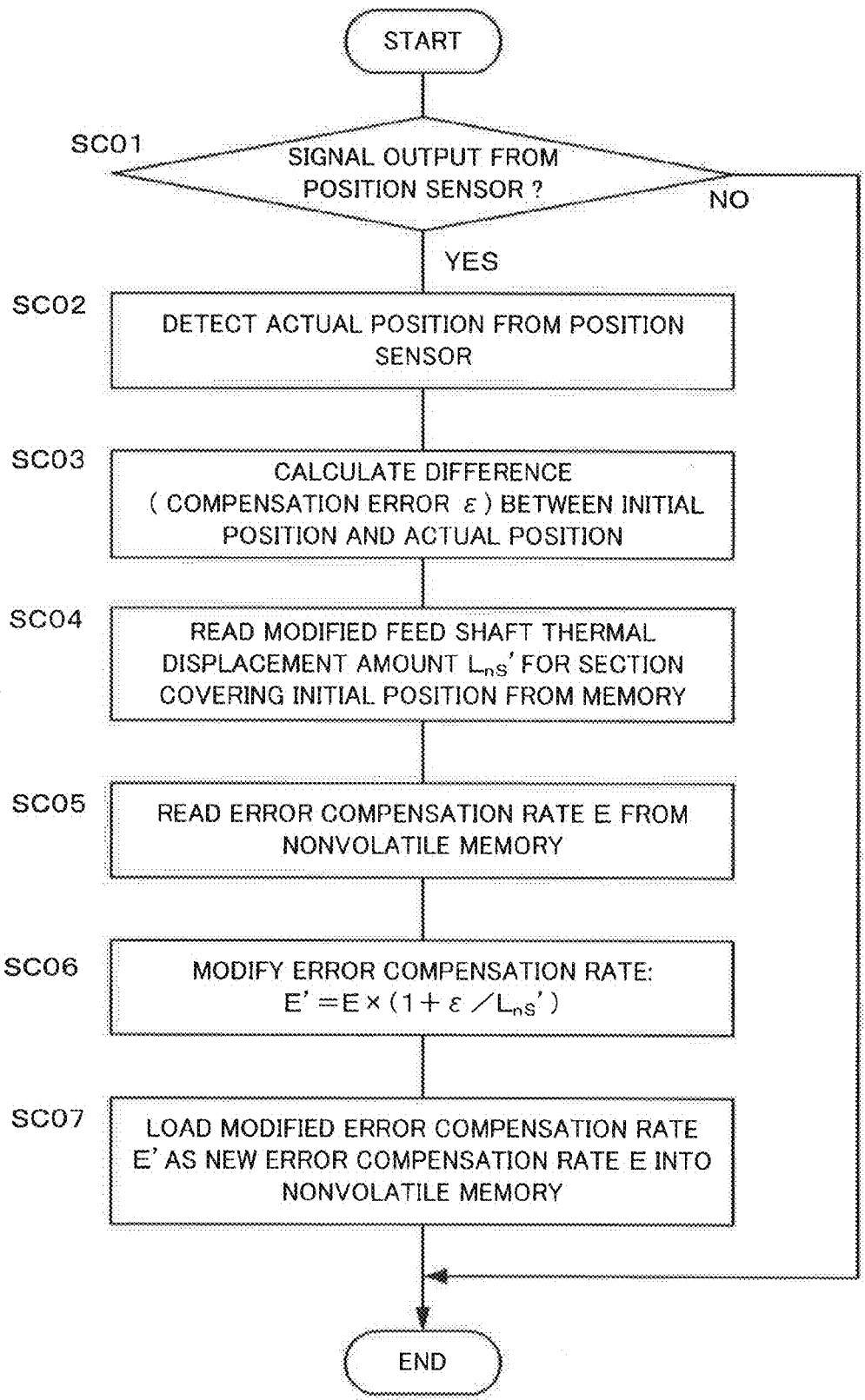
FIG. 6 is a flowchart showing processing procedures for error compensation rate calculation.

In the processing shown in the flowchart of FIG. 6, the error compensation rate E continues to be updated based on the actual positions detected by the proximity switch for use as the position sensor. In other words, the error compensation rate E goes on being updated based on the difference c between the initial and actual positions in Step SC06 in the flowchart of FIG. 6. Therefore, high-precision compensation can be achieved in consideration of even thermal displacements that do not depend on the machine operation, such as incessant changes in ambient temperatures.

If the machine tool is powered on again after it is powered off, the error compensation rates E is stored in the nonvolatile memory, as a result, compensation can be resumed using the value of the error compensation rate E which has been stored at the time immediately before powering off of the machine tool. Thus, the error compensation rate E modified depending on the environment in which the machine tool is installed can be used, instead of the error compensation rate E set at the time of factory shipment. The error compensation rate E is initialized at 1.0 and loaded into the memory at the time of factory shipment.

C. The following is a description of a second embodiment for thermal displacement compensation of a machine tool according to the present invention.

(c1) Setting of sections for estimation and compensation of thermal displacement amount of feed axis:

Since this processing is performed in the same manner as "(b1) Setting of sections for estimation and compensation of thermal displacement amount of feed axis" according to the first embodiment, a description thereof is omitted.

(c2) Compensation of thermal displacement of feed axis:

Since this processing is performed in the same manner as "(b2) Compensation of thermal displacement of feed axis" according to the first embodiment, a description thereof is omitted.

Figure 7:
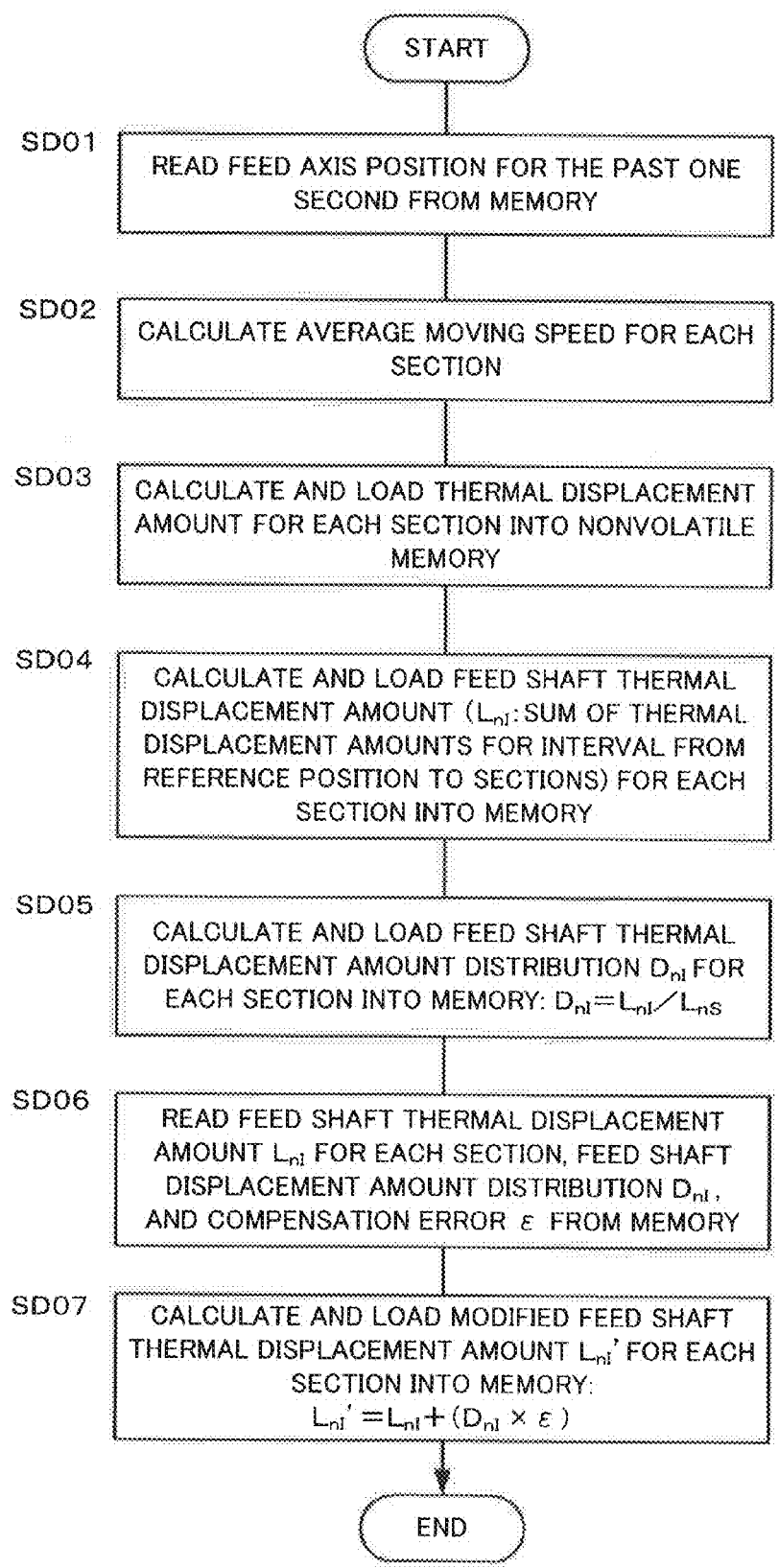
FIG. 7 is a flowchart showing processing procedures for thermal displacement amount calculation.

(c3) Calculation of thermal displacement amount of feed axis:

In calculating the thermal displacement amount of the feed axis, the processing shown in the flowchart of FIG. 7 is performed for each predetermined period (e.g., for each second). The following is a sequential description of steps of the processing shown in the flowchart of FIG. 7.

[Step SD01] The feed axis position over the past one second, stored in a memory in the processing (Step SA01) shown in the flowchart of FIG. 4 is read from the memory.

[Step SD02] An average moving speed for each section is obtained based on the feed axis position read from the memory in Step SD01.

[Step SD03] The thermal displacement amount for each section is obtained based on the average moving speed for each section in Step SD02 and loaded into the nonvolatile memory.

[Step SD04] A feed shaft thermal displacement amount $L_{nI}$ for the interval from a reference position 7 to section I (I=0, 1, 2, . . . ) is obtained by adding up thermal displacement amounts for individual sections I using equation (1') and loaded into the memory. For example, feed shaft thermal displacement amounts for sections 0, 1 and 2 are $L_{n0}=\delta_{n0}$, $L_{n1}=\delta_{n0}+\delta_{n1}$, and $L_{n2}=\delta_{n0}+\delta_{n1}+\delta_{n2}$, respectively.

[Step SD05] A ratio $D_{nI} (=L_{nI}/L_{nS})$ (hereinafter referred to as feed shaft thermal displacement amount distribution) of the feed shaft thermal displacement amount $L_{nI}$ for section I to a feed shaft thermal displacement amount $L_{nS}$ for section S that covers an initial position is calculated and loaded into the memory.

[Step SD06] The feed shaft thermal displacement amount $L_{nI}$ for section I (I=0, 1, 2, . . . ), the feed shaft thermal displacement amount distribution $D_{nI}$, and a compensation error c are read from the memory.

[Step SD07] A modified feed shaft thermal displacement amount $L_{nI}'$ is obtained by adding an error compensation amount $(D_{nI}\times\epsilon)$ to the feed shaft thermal displacement amount $L_{nI}$ for section I (I=0, 1, 2, . . . ) and loaded into the memory. Specifically, the modified feed shaft thermal displacement amount $L_{nI}'$ for section I is obtained according to the following equation (4), based on the feed shaft thermal displacement amount $L_{nI}$, feed shaft thermal displacement amount distribution $D_{nI}$, and compensation error ϵ read in Step SD06, and loaded into the memory, whereupon the processing terminates:

$$L_{nI}'=L_{nI}+(D_{nI}\times\epsilon) \quad (4)$$

Figure 8:
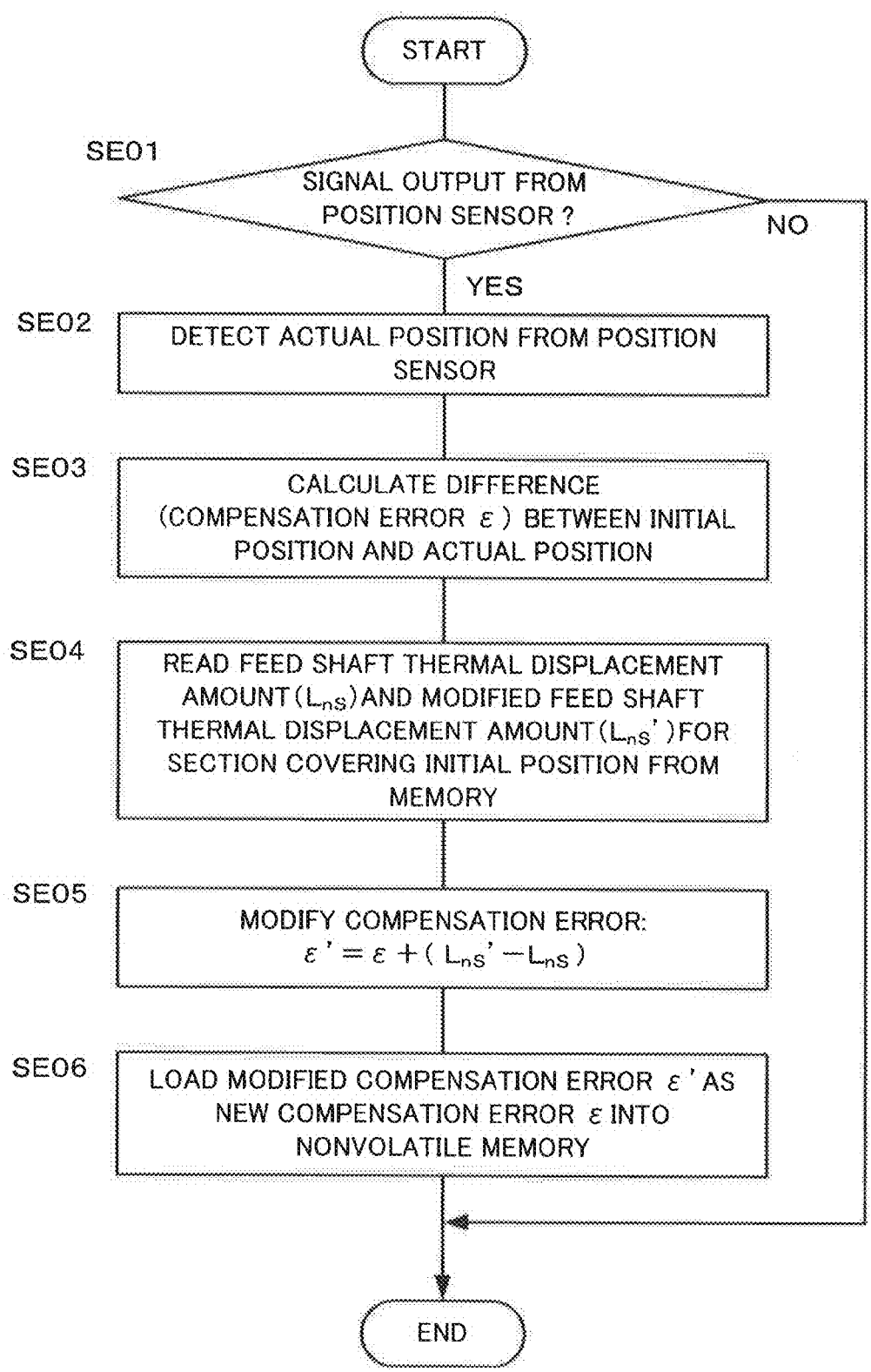
FIG. 8 is a flowchart showing compensation error calculation.

(c4) Calculation of compensation error ϵ:

In calculating the compensation error ϵ, the processing shown in the flowchart of FIG. 8 is performed for each predetermined period (e.g., for each 4 millisecond, as in the case of FIG. 4). The following is a sequential description of steps of the processing shown in the flowchart of FIG. 8.

[Step SE01] It is determined whether or not a signal is output from a position sensor. If there is a signal output, the program proceeds to Step SE02. If not, the processing terminates.

[Step SE02] If the output signal from the position sensor is received while a feed axis is moving, an actual position is detected based on the signal from the position sensor. This actual position is a position detected after thermal displacement compensation.

[Step SE03] An error ϵ in the previously stored initial position is obtained from the difference between the initial position and the actual position detected in Step SE02. This error ϵ is the difference between the previously stored initial position and the position detected after performing thermal displacement compensation during the machining operation, that is, a compensation error.

[Step SE04] The feed shaft thermal displacement amount $L_{nS}$ and the modified feed shaft thermal displacement amount $L_{nS}'$ for the section (assumed to be section S) that covers the initial position are read from the memory.

[Step SE05] A modified compensation error cy is obtained according to the following equation (5) based on the feed shaft thermal displacement amount $L_{nS}$ and the modified feed shaft thermal displacement amount $L_{nS}'$ for the section (assumed to be section S) that covers the initial position, read in Step SE04, and the compensation error c obtained in Step SE03:

$$\epsilon'=\epsilon+(L_{nS}'-L_{nS}) \quad (5)$$

[Step SE06] The modified compensation error cy obtained in Step SE05 is loaded as a new compensation error ϵ into the nonvolatile memory, whereupon the processing terminates.

D. The following is a description of a third embodiment for thermal displacement compensation of a machine tool according to the present invention.

In the first and second embodiments described above, the feed shaft thermal displacement amount is calculated by dividing the overall length of the feed axis into a plurality of sections and obtaining the thermal displacement amount for each section.

The present invention is not limited to the methods described in connection with the first and second embodiments, and is also applicable to a method in which a feed shaft thermal displacement amount is obtained without dividing a feed axis into sections, as in a third embodiment. In this third embodiment, as in the first and second embodiments, a compensation error in a previously stored initial position is obtained from the difference between the initial position and an actual position.

In obtaining an error compensation rate, as described in connection with "(b4) Calculation of error compensation rate E" of the first embodiment, a modified error compensation rate is obtained from a modified feed shaft thermal displacement amount in the initial position, compensation error, and error compensation rate, and it is loaded as a new error compensation rate E into a nonvolatile memory. In calculating the compensation error, as described in connection with "(c4) Calculation of compensation error ϵ" of the second embodiment, a modified compensation error is obtained from the thermal displacement compensation amount in the initial position, modified thermal displacement compensation amount, and compensation error, and it is loaded as a new compensation error c into the nonvolatile memory.

The calculation of the thermal displacement amount may be performed based on any one or more of conditions including motor rotational speed, motor temperature, motor load, motor current value, motor power consumption, and energy generated by a motor, instead of the average moving speed of the feed axis. Further, this calculation may be performed based on temperature data from a temperature sensor installed in position.

Moreover, there may be provided a means for activating or inactivating the modification of the thermal displacement compensation amount. For example, a value set using a screen is read, or a value of signal is read from a control panel or external switches in order to determine whether the read value serves to activate the modification of the thermal displacement compensation amount or not. If the value is determined to activate the modification, the processing is performed in the same manner as in the foregoing embodiments. If the value is determined not to activate the modification, it is only necessary to set the error compensation rate E to 1.0, without performing detection of the actual position, calculation of the compensation error ϵ, or modification of the error compensation rate E, even if an output signal is received from a position sensor. In the case where the compensation error ϵ is to be calculated, it is only necessary to set the compensation error ϵ to zero, without performing calculation and modification of the compensation error ϵ or detection of the actual position.

The invention claimed is:

1. A thermal displacement compensation method for a machine tool, the thermal displacement compensation method comprising:
   setting a position sensor in a detectable position where a position of a movable part of the machine tool is detectable such that the position sensor outputs a signal when the detectable position is reached by the movable part, and previously storing a position where the signal is first output by the position sensor as an initial position;
   detecting the position where the signal is output by the position sensor as an actual position;
   calculating a difference between the stored initial position and the detected actual position as a compensation error in the initial position;
   obtaining a feed shaft thermal displacement amount;
   modifying the feed shaft thermal displacement amount according to an error compensation rate to obtain a modified feed shaft thermal displacement amount;
   compensating a position command for a feed axis by adding a thermal displacement compensation amount, which cancels the modified feed shaft thermal displacement amount, to the position command for the feed axis; and
   updating the error compensation rate based on the compensation error and the modified feed shaft thermal displacement amount corresponding to the initial position.

2. The thermal displacement compensation method according to claim 1, wherein the initial position is previously stored before the start of machining.

3. The thermal displacement compensation method according to claim 1, wherein
   the modifying of the feed shaft thermal displacement amount comprises:
   obtaining a value of the error compensation rate from a storage device, and
   multiplying the feed shaft thermal displacement amount by the obtained value of the error compensation rate to obtain the modified feed shaft thermal displacement amount, and
   the updating of the error compensation rate comprises:
   determining a modified value of the error compensation rate based on a ratio of the compensation error to the modified feed shaft thermal displacement amount corresponding to the initial position, and
   updating the value of the error compensation rate in the storage device with the modified value.

4. The thermal displacement compensation method according to claim 1, wherein
   the thermal displacement compensation method comprises:
   dividing the feed axis into a plurality of sections,
   obtaining the feed shaft thermal displacement amount for each section of the plurality of sections, and
   determining the modified feed shaft thermal displacement amount for each section of the plurality of sections.

5. The thermal displacement compensation method according to claim 1, wherein
   the position sensor is set in a position allowing the position sensor to detect the position of the movable part within a range of movement of the movable part based on a machining program, and
   the modifying of the feed shaft thermal displacement amount is performed while the machining program is being executed.

6. The thermal displacement compensation method according to claim 1, wherein
   the updating of the error compensation rate is performed at a first frequency, and
   the obtaining of the feed shaft thermal displacement amount is performed at a second frequency lower than the first frequency.

7. The thermal displacement compensation method according to claim 1, wherein the updating of the error compensation rate comprises using the following equation:

$$E'=E\times(1+\epsilon/L_{nS}')$$

where
ϵ is the compensation error,
E is a current value of the error compensation rate,
E' is an updated value of the error compensation rate, and
$L_{nS}'$ is the modified feed shaft thermal displacement amount corresponding to the initial position.

8. The thermal displacement compensation method according to claim 1, wherein the modifying of the feed shaft thermal displacement amount comprises using the following equation:

$$L_{nI}'=L_{nI}\times E$$

where
E is the error compensation rate,
$L_{nI}$ is the feed shaft thermal displacement amount corresponding to a section of the feed axis, $L_{nI}'$ is the modified feed shaft thermal displacement amount corresponding to the section of the feed axis.

9. A thermal displacement compensation device for a machine tool, the thermal displacement compensation device comprising:
- a position sensor set in a detectable position where a position of a movable part of the machine tool is detectable, the position sensor configured to output a signal when the detectable position is reached by the movable part;
- a storage device previously storing a position where the signal is first output by the position sensor as an initial position; and
- a processor configured to
    - determine, as an actual position, the position where the signal is output by the position sensor,
    - calculate, as a compensation error, a difference between the initial position and the actual position,
    - obtain a feed shaft thermal displacement amount;
    - modify the feed shaft thermal displacement amount according to the compensation error to obtain a modified feed shaft thermal displacement amount;
    - compensating a position command for a feed axis by adding a thermal displacement compensation amount, which cancels the modified feed shaft thermal displacement amount, to the position command for the feed axis; and
    - update the compensation error based on the modified feed shaft thermal displacement amount.

10. The thermal displacement compensation device according to claim 9, wherein the storage device is configured to previously store the initial position before the start of machining.

11. The thermal displacement compensation device according to claim 9, wherein the processor is configured to
- calculate the feed shaft thermal displacement amount in accordance with a position of the feed axis,
- obtain an error compensation amount from the compensation error and the ratio of the feed shaft thermal displacement amount in the position of the feed axis to the feed shaft thermal displacement amount in the initial position, and
- add the obtained error compensation amount to the feed shaft thermal displacement amount to obtain the modified feed shaft thermal displacement amount.

12. The thermal displacement compensation device according to claim 9, wherein the processor is configured to
- divide the feed axis into a plurality of sections,
- obtain the feed shaft thermal displacement amount for each section of the plurality of sections, and
- determine the modified feed shaft thermal displacement amount for each section of the plurality of sections.

13. The thermal displacement compensation device according to claim 9, wherein
- the position sensor is set in a position allowing the position sensor to detect the position of the movable part within a range of movement of the movable part based on a machining program, and
- the processor is configured to modify the feed shaft thermal displacement amount while the machining program is being executed.

14. The thermal displacement compensation device according to claim 9, wherein the processor is configured to
- update the compensation error at a first frequency, and
- obtain a feed shaft thermal displacement amount at a second frequency lower than the first frequency.

15. The thermal displacement compensation device according to claim 9, wherein the processor is configured to update the compensation error by
- obtaining a value of the compensation error from the storage device,
- determining a modified value of the compensation error based on (a) the feed shaft thermal displacement amount corresponding to the initial position and (b) the modified feed shaft thermal displacement amount corresponding to the initial position, and
- updating the value of the compensation error in the storage device with the modified value.

16. The thermal displacement compensation device according to claim 9, wherein the processor is configured to update the compensation error by using the following equation:

$$\epsilon' = \epsilon + (L_{nS}' - L_{nS}),$$

where
- $\epsilon$ is a current value of the compensation error,
- $\epsilon'$ is an updated value of the compensation error,
- $L_{nS}$ is the feed shaft thermal displacement amount corresponding to the initial position, and
- $L_{nS}'$ is the modified feed shaft thermal displacement amount corresponding to the initial position.

17. The thermal displacement compensation device according to claim 9, wherein the processor is configured to modify the feed shaft thermal displacement amount by using the following equations:

$$L_{nI}' = L_{nI} + (D_{nI} \times \epsilon), \text{ and}$$

$$D_{nI} = L_{nI}/L_{nS},$$

where
- $\epsilon$ is the compensation error,
- $L_{nI}$ is the feed shaft thermal displacement amount corresponding to a section of the feed axis,
- $L_{nI'}$ is the modified feed shaft thermal displacement amount corresponding to the section of the feed axis, and
- $L_{nS}$ is the feed shaft thermal displacement amount corresponding to the initial position.

* * * * *